US006319310B1

(12) United States Patent
Wong et al.

(10) Patent No.: US 6,319,310 B1
(45) Date of Patent: Nov. 20, 2001

(54) PHASE CHANGE INK COMPOSITIONS

(75) Inventors: Raymond W. Wong; Marcel P. Breton; Shadi L. Malhotra, all of Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/575,780

(22) Filed: May 22, 2000

Related U.S. Application Data

(63) Continuation-in-part of application No. 09/362,673, filed on Jul. 29, 1999, now Pat. No. 6,132,499, and a continuation-in-part of application No. 09/281,682, filed on Mar. 30, 1999, now Pat. No. 6,187,082, and a continuation-in-part of application No. 09/300,333, filed on Apr. 27, 1999, now Pat. No. 6,071,333.

(51) Int. Cl.$^7$ ................................................ C09D 11/00
(52) U.S. Cl. ................................ 106/31.29; 106/31.61; 106/31.43; 106/31.75
(58) Field of Search ............................ 106/31.29, 31.61, 106/31.43, 31.75

(56) References Cited

U.S. PATENT DOCUMENTS

| | | | |
|---|---|---|---|
| 3,953,218 | 4/1976 | Pollard | 106/19 |
| 4,490,731 | 12/1984 | Vaught | 346/140 R |
| 4,745,419 | 5/1988 | Quate et al. | 346/140 R |
| 4,751,528 | 6/1988 | Spehrley, Jr. et al. | 346/140 R |
| 4,791,439 | 12/1988 | Guiles | 346/140 R |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,098,477 | 3/1992 | Vieira et al. | 106/22 |
| 5,122,187 | 6/1992 | Schwarz et al. | 106/25 |
| 5,124,718 | 6/1992 | Koike et al. | 346/1.1 |
| 5,538,550 | 7/1996 | Yaegashi et al. | 106/22 A |
| 5,541,627 | 7/1996 | Quate | 347/10 |
| 5,667,568 | 9/1997 | Sacripante et al. | 106/20 R |
| 5,693,126 | 12/1997 | Ito | 106/20 R |
| 5,693,128 | 12/1997 | Sacripante et al. | 106/31.27 |
| 5,698,017 | 12/1997 | Sacripante et al. | 106/31.49 |
| 5,700,316 | 12/1997 | Pontes et al. | 106/31.58 |
| 5,876,492 | 3/1999 | Malhotra et al. | 106/31.58 |
| 5,897,940 | 4/1999 | Malhotra | 428/212 |
| 5,902,390 | 5/1999 | Malhotra et al. | 106/31.58 |
| 5,922,117 | 7/1999 | Malhotra et al. | 106/31.58 |
| 5,931,995 | 8/1999 | Malhotra et al. | 106/31.58 |
| 5,932,630 | 8/1999 | Kovacs et al. | 523/161 |
| 5,948,155 | 9/1999 | Yui et al. | 106/31.58 |
| 5,954,866 | 9/1999 | Ohta et al. | 106/31.89 |
| 5,958,119 | 9/1999 | Malhotra et al. | 106/31.43 |
| 5,989,325 | 11/1999 | Sacripante et al. | 106/31.27 |
| 6,045,607 | 4/2000 | Breton et al. | 106/31.29 |
| 6,071,333 | * 6/2000 | Breton et al. | 106/31.43 |
| 6,132,499 | * 10/2000 | Wong et al. | 106/31.29 |
| 6,187,082 | * 2/2001 | Goodbrand et al. | 106/31.29 |

* cited by examiner

*Primary Examiner*—C. Melissa Koslow
*Assistant Examiner*—Veronica F. Faison
(74) *Attorney, Agent, or Firm*—Judith L. Byorick

(57) ABSTRACT

Disclosed is a phase change ink comprising (a) a carbamate or thiourea, said carbamate or thiourea having a melting point of no higher than about 120° C. and an acoustic loss value of no more than about 100 decibels per millimeter, (b) a colorant, (c) a branched hydrocarbon with a number average molecular weight of no more than about 10,000 and a melting point or softening point of no more than about 120° C., (d) an optional plasticizer, (e) an optional alcohol having a melting point of less than about 90° C. and an acoustic loss value of no more than about 100 decibels per millimeter, (f) an optional lightfastness-imparting agent, and (g) an optional antioxidant.

49 Claims, No Drawings

PHASE CHANGE INK COMPOSITIONS

This application is a continuation-in-part of U.S. Ser. No. 09/362,673, filed Jul. 29, 1999 now U.S. Pat. No. 6,132,499, of U.S. Ser. No. 09/281,682, filed Mar. 30, 1999 now U.S. Pat. No. 6,187,082 and of U.S Ser. No. 09/300,333, filed Apr. 27, 1999 now U.S. Pat. No. 6,071,333, the disclosures of each of which are totally incorporated herein by reference.

Copending Application U.S. Pat. No. 6,132,499, filed Jul. 29, 1999, entitled "Inks," with the named inventors Raymond W. Wong, Marcel P. Breton, Danielle C. Boils, Fatima M. Mayer, and Shadi L. Malhotra, the disclosure of which is totally incorporated herein by reference, discloses an ink composition comprising (1) a carbamate or thiourea each with a melting point of from about 60° C. to about 120° C. and an acoustic loss value of from about 25 to about 80 dB/mm, (2) an alcohol compound with melting point of about 25° C. to about 90° C. and with an acoustic loss value of from about 5 to about 40 dB/mm, (3) a lightfastness component, (4) an antioxidant, and (5) a colorant.

Copending Application U.S. Pat. No. 6,110,265, filed Apr. 27, 1999, entitled "Ink Compositions,"with the named inventors Marcel P. Breton, Shadi L. Malhotra, Raymond W. Wong, Danielle C. Boils, Carl P. Tripp, and Pudupodi R. Sundararajan, the disclosure of which is totally incorporated herein by reference, discloses an ink composition comprising (1) a solid oxazoline compound with a melting point of from about 60° C. to about 120° C. and an acoustic loss value of about 25 to about 80 dB/mm; (2) a carbamate compound with a melting point of from about 25° C. to about 100° C.; (3) an alcohol compound; (4) a lightfastness component; (5) a lightfastness antioxidant; and (6) a colorant.

Copending Application U.S. Pat. No. 6,071,333, filed Apr. 27, 1999, entitled "Ink Compositions," with the named inventors Marcel P. Breton, Shadi L. Malhotra, and Raymond W. Wong, the disclosure of which is totally incorporated herein by reference, discloses an ink composition containing (1) a solid carbamate compound; (2) an alcohol compound with a melting point of from about 25° C. to about 90° C.; (3) a lightfastness component; (4) a lightfastness antioxidant; and (5) a colorant, Copending Application U.S. Pat. No. 6,187,082, filed Mar. 30, 1999, entitled "Ink Compositions," with the named inventors H.

Bruce Goodbrand, Danielle C. Boils, Pudupadi R. Sundararajan, Raymond W. Wong, and Shadi L. Malhotra, the disclosure of which is totally incorporated herein by reference, discloses an ink composition comprising (1) a thiourea with a melting point of from about 60 to about 120° C. and with an acoustic loss value of from about 25 to about 80 dB/mm, (2) an optional ink carbamate with a melting point of from about 25° C. to about 60° C. and with an acoustic loss value of from about 5 to about 40 dB/mm, (3) a lightfastness component, (4) a lighffast antioxidant, and (5) a colorant.

Copending Application U.S. Pat. No. 6,300,373, filed Apr. 27, 1999, entitled "Ink Compositions," with the named inventors Marcel P. Breton, Shadi L. Malhotra, and Raymond W. Wong, the disclosure of which is totally incorporated herein by reference, discloses an ink composition comprising (1) a solid urea compound; (2) an alcohol; (3) a lightfastness component; (4) a lightfast antioxidant; and (5) a colorant.

Copending Application U.S. Pat. No. 6,106,601, filed Apr. 27, 1999, entitled "Ink Compositions," with the named inventors Shadi L. Malhotra, Raymond W. Wong, and Marcel P. Breton, the disclosure of which is totally incorporated herein by reference, discloses an ink composition comprising (1) an oxazoline compound, (2) a thiourea compound with an optional melting point of from about 25 to about 100° C., and with an optional acoustic loss value of from about 5 to about 40 dB/mm; (3) an alcohol; (4) a lightfastness compound; (5) an antioxidant, and (6) a colorant.

Copending Application U.S. Ser. No. 09/495,716, filed Feb. 1, 200, entitled "Acoustic Printing Inks Containing Bis(Carbamates)," with the named inventors H. Bruce Goodbrand, Danielle C. Boils, Pudupadi R. Sundararajan, and Raymond W. Wong, the disclosure of which is totally incorporated herein by reference, discloses a printing process which comprises (1) incorporating into an acoustic ink jet printing apparatus an ink composition comprising (a) an ink vehicle which comprises a bis(carbamate) of the formula

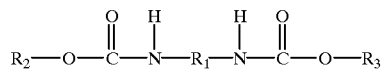

wherein $R_1$ is an alkylene group and $R_2$ and $R_3$ each, independently of the other, are alkyl groups or alkylene oxide or polyalkylene oxide groups of the formula —$(C_nH_{2n}O)_yH$, wherein n is an integer of 2 or 3 and y is an integer representing the number of repeat alkylene oxide units, (b) a colorant, (c) an optional conductivity enhancing agent, (d) an optional antioxidant, (e) an optional UV absorber, (f) an optional clarifier, (g) an optional tackifier, (h) an optional adhesive, and (i) an optional plasticizer, (2) melting the ink, and (3) causing droplets of the melted ink to be ejected by acoustic beams in an imagewise pattern onto a recording sheet.

Copending Application U.S. Pat. No. 6,187,083, filed Sep. 23, 1999, entitled "Conductive Inks Containing Sulfonate Salts," with the named inventors Shadi L. Malhotra, Raymond W. Wong, and Marcel P. Breton, the disclosure of which is totally incorporated herein by reference, discloses an ink composition comprising (a) an ink vehicle which is selected from (i) 1,3-dialkyl ureas, (ii) N,N'-ethylene bisalkylamides, (iii) N-(4-chloro-3-(4,5-dihydro-5-oxo-1-(2,4,6-trichlorophenyl)-1H-pyrazol-3-yl amino) phenyl)-2-(1-octadecenyl) succinimide, (iv) 1,3-diamino-5,6-bis (octyloxy) isoindoline, (v) N,N-dimethyl alkylamine N-oxides, (vi) alkyl amides, or (vii) mixtures thereof, said ink vehicle having a melting point of no lower than about 60° C. and no higher than about 155° C., (b) a viscosity modifier which is an amide having a melting point of no lower than about 60° C. and no higher than about 155° C., (c) a conductive sulfonate salt having a melting point of no lower than about 60° C. and no higher than about 155° C., (d) a colorant, (e) an optional antioxidant, and (f) an optional ultraviolet absorber.

Copending Application U.S. Pat. No. 6,086,661, filed Apr. 27, 1999, entitled "Ink Compositions," with the named inventors Shadi L. Malhotra, James D. Mayo, and Marcel P. Breton, the disclosure of which is totally incorporated herein by reference, discloses an aqueous ink composition comprising (1) a quaternary compound selected from the group consisting of (a) imidazolinium quaternary salts, (b) phosphonium quaternary salts, and (c) an ammonium quaternary salt; (2) a liquid ink vehicle, (3) a paper-curl reducing compound; (4) a lightfastness component; (5) a lightfastness antioxidant; (6) a substantially water soluble organic salt or a substantially water soluble inorganic salt; (7) a biocide; and (8) a colorant.

Copending Application U.S. Pat. No. 6,096,124, filed Apr. 27, 1999, entitled "Ink Compositions," with the named inventors Raymond W. Wong, Shadi L. Malhotra, and Marcel P. Breton, the disclosure of which is totally incorporated herein by reference, discloses a conductive ink composition comprising (1) an acid salt; (2) a conductive quaternary compound; (3) a viscosity modifying compound; (4) a lightfastness component; (5) a lightfastness antioxidant; and (6) a colorant.

Copending Application U.S. Pat. No. 6,096,125, filed Apr. 27, 1999, entitled "Ink Compositions," with the named inventors Marcel P. Breton Shadi L. Malhotra, Danielle C. Boils, Raymond W. Wong, Guerino G. Sacripante, and John M. Lennon, the disclosure of which is totally incorporated herein by reference, discloses an ink composition comprising (1) a mixture comprising a salt and an oxyalkylene compound wherein the conductive mixture possesses a melting point of from about 60° C. to about 120° C.; (2) an ink vehicle compound with a melting point of from about 80° C. to about 100° C.; (3) a viscosity modifying amide compound; (4) a lightfastness component; (5) a lightfastness antioxidant; and (6) a colorant.

Copending Application U.S. Pat. No. 6,174,355, filed Jul. 29, 1999, entitled "Ink Compositions," with the named inventors James D. Mayo, Daniel A. Foucher, Marcel P. Breton, and Fereshteh Lesani, the disclosure of which is totally incorporated herein by reference, discloses an ink composition comprising a colorant and poly(diallyl diethyl ammonium) bromide.

Copending Application U.S. Ser. No. 09/281,540, filed Mar. 30, 1999, entitled "Ink Compositions," with the named inventors Shadi L. Malhotra, James D. Mayo, Marcel P. Breton, and Yvan Gagnon, the disclosure of which is totally incorporated herein by reference, discloses an aqueous ink composition with a surface tension of from about 45 to about 60 dynes per centimeter, and which composition comprises (1) a quaternary polymer selected from the group consisting of:

(a) a ureylene quaternary ammonium polymer of the formula

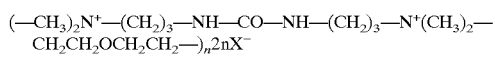

wherein n represents the number of segments and wherein said number is from about 3 to about 25, and wherein X is an anion;

(b) a quaternary ammonium polymer of the formula

wherein n represents the number of segments ranging from about 6 to about 100, X is an anion of a halide, or an alkylsulfate;

(c) a quaternary ammonium polymer of the following formula

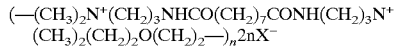

wherein n is a number of from about 6 to about 100, and X is an anion of halide, or an alkylsulfate;

(d) quaternary ammonium block copolymers of the formula

$(CH_2)_3NHCO(CH_2)_4CONH(CH_2)_3N^+(CH_3)_2(CH_2)_2O$ $(CH_2)_2—)_n4nX^-$ wherein n varies from about 6 to about 50, and X is an anion;

(e) a quaternary copolymer of the formula Cl—$(CH_2$—$CH((CH_2)_m$—$N^+R_1R_2R_3)$—$O)_n$—H 2nX$^-$ wherein m represents a number of 1 to 10, n represents a number of from about 5 to about 20, $R_1$, $R_2$, $R_3$ is alkyl or hydrogen, and X is an anion; (2) a liquid ink vehicle; (3) a paper curl reducing compound (anti-curl agent); (4) a lightfastness component; (5) a lightfast antioxidant; (6) a biocide, (7) a water soluble organic salt or a water soluble inorganic salt; (8) a colorant; and (9) an optional solvent.

Copending Application U.S. Ser. No. 09/575,760, filed concurrently herewith, entitled "Phase Change Inks," with named inventors Jaan Noolandi, Marcel P. Breton, Raymond W. Wong, H. Bruce Goodbrand, and Fatima M. Mayer, the disclosure of which is totally incorporated herein by reference, discloses an ink composition comprising (a) an ink vehicle, (b) a colorant, (c) an anionic surfactant, (d) a cationic surfactant, (e) an optional nonionic surfactant, (f) an optional conductivity enhancing agent, (g) an optional antioxidant, and (h) an optional UV absorber, said ink composition being solid at 25° C. and having a melting point of about 60° C. or higher.

BACKGROUND OF THE INVENTION

The present invention is directed to phase change ink compositions. More specifically, the present invention is directed to phase change ink compositions particularly suitable for use in hot melt acoustic ink jet printing processes. One embodiment of the present invention is directed to a phase change ink comprising (a) a carbamate or thiourea, said carbamate or thiourea having a melting point of no higher than about 120° C. and an acoustic loss value of no more than about 100 decibels per millimeter, (b) a colorant, (c) a branched hydrocarbon with a number average molecular weight of no more than about 10,000 and a melting point or softening point of no more than about 120° C., (d) an optional plasticizer, (e) an optional alcohol having a melting point of less than about 90° C. and an acoustic loss value of no more than about 100 decibels per millimeter, (f) an optional lightfastness-imparting agent, and (g) an optional antioxidant, Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed, This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, U.S. Pat. No. 4,797,693, U.S. Pat. No. 5,121,141, U.S. Pat. No. 5,111,220, U.S. Pat. No. 5,128,726, and U.S. Pat. No. 5,371,531, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate such that the resulting image exhibits a hardness value of from about 0.1 to about 0.5 millimeter (measured with a penetrometer according to the ASTM penetration method D1321).

Ink jet printing processes that employ inks that are solid at room temperature and liquid at elevated temperatures are known. For example, U.S. Pat. No. 4,490,731 (Vaught), the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of non-printing. The vehicle selected possesses a low critical temperature to permit the use of the solid ink in a thermal ink jet printer. In thermal ink jet printing processes employing these phase change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase change ink is applied to the substrate, freezing on the substrate resolidifies the ink.

U.S. Pat. No. 4,751,528 (Spehrley, Jr. et al.), the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

U.S. Pat. No. 4,791,439 (Guiles), the disclosure of which is totally incorporated herein by reference, discloses an ink jet apparatus for use with hot melt ink having an integrally connected ink jet head and reservoir system, the reservoir system including a highly efficient heat conducting plate, such as aluminum, inserted within an essentially non-heat conducting reservoir housing. The reservoir system has a sloping flow path between an inlet position and a sump from which ink is drawn to the head, and includes a plurality of vanes situated upon the plate for rapid heat transfer.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamindes; phosphites; phosphonates; phosphates; alkyl sulfines; alkyl acetates; and sulfur dioxide. Also disclosed are hot melt ink compositions suitable for ink jet printing which comprise a colorant a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment the binder comprises a liquid crystalline material, U.S. Pat. No. 5,041,161 (Cooke et al,), the disclosure of which is totally incorporated herein by reference, discloses an ink jet ink which is semi-solid at room temperature. The subject ink combines the advantageous properties of thermal phase change inks and liquid inks. More particularly, the inks comprise vehicles, such as glyceryl esters, polyoxyethylene esters, waxes, fatty acids, and mixtures thereof, which are semi-solid at temperatures between 20° and 45° C. The ink is impulse jetted at an elevated temperature in the range of above 45° C. to about 110° C., at which temperature the ink has a viscosity of about 10 to 15 centipoise. The subject inks exhibit controlled penetration and spreading, but do not remain on the surface of most substrates where they would be prone to burnishing, cracking or flaking. These inks further comprise 0.1 to 30 weight percent of a colorant system.

U.S. Pat. No. 4,853,036 (Koike et al.) and U.S. Pat. No. 5,124,718, the disclosures of each of which are totally incorporated herein by reference, disclose an ink for ink jet recording which comprises a liquid composition essentially comprising a coloring matter, a volatile solvent having a vapor pressure of 1 mm Hg or more at 25° C., and a material being solid at room temperature and having a molecular weight of 300 or more; and prepared so as to satisfy formula $B_1/A_1 \geq 3$, assuming viscosity as $A_1$ cP at 25° C. measured when the content of the solid material in said composition is 10 percent by weight, and assuming viscosity as $B_1$ cP at 25° C. measured when the content of the solid material in said composition is 30 percent by weight. An ink jet recording process employing the ink is also provided.

In phase change printing processes, the ink preferably undergoes a change with temperature from a solid state to a liquid state in a desirably short period of time, typically in less than about 100 milliseconds. One advantage of phase change inks is their ability to print superior images on plain paper, since the phase change ink quickly solidifies as it cools, and, since it is primarily waxy in nature, it does not normally soak into a paper medium.

Phase change inks also preferably exhibit a high degree of transparency, generally measured in terms of haze value of the ink. Transparent, low haze inks exhibit high gloss and high optical density compared to opaque inks, although both may appear to be evenly colored.

The use of phase change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also be attracted by an electric field.

Phase change inks used in acoustic ink printing processes also preferably exhibit a low acoustic loss value, typically below about 100 decibels per millimeter. In addition, the ink vehicle preferably can fill the pores of a porous substrate, such as paper, and preferably has a melting point of from about 80 to about 120° C.; this melting point, along with low acoustic loss, enables a minimization of energy consumption, When the phase change inks are used in an electric field assisted acoustic ink printing process, the inks also are sufficiently conductive to permit the transmission of electrical signals generated by the electric field assisted acoustic ink jet printer; the inks preferably exhibit a conductivity of from about 2 to about 9 log(picomho/cm) (measured under melt conditions at about 150° C. by placing an aluminum electrode in the molten ink and reading the resistivity output on a GenRad 1689 precision RLC Digibridge at a frequency of 1 kiloHertz). In general, the conductivity of a material can be measured in terms of the reciprocal of resistivity, which is the capacity for electrical resistance. Further information regarding electric field assisted acoustic ink printing processes is disclosed in, for example, Copending Application U.S. Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference, which discloses a method of forming and moving ink drops across a gap between a printhead and a print medium or intermediate print medium in a marking device. The method includes generating an electric field, forming the ink drops adjacent to the printhead, and controlling the electric field. The electric field is generated to extend across the gap. The ink drops are formed in an area adjacent to the printhead. The electric field is controlled such that an electrical attraction force exerted on the formed ink drops by the electric field is the greatest force acting on the ink drops. The marking device can be incorporated into a transfuse printing system having an intermediate print medium made of one or more materials that allow for lateral dissipation of electrical charge from the incident ink drops.

U.S. Pat. No. 6,045,607 (Breton et al.), the disclosure of which is totally incorporated herein by reference, discloses an ink composition containing (1) a first solid carbamate, (2) a second carbamate with a dissimilar melting point than the first solid carbamate (1), (3) a lightfastness component, (4) a lightfastness antioxidant, and (5) a colorant.

U.S. Pat. No. 5,932,630 (Kovacs et al.), the disclosure of which is totally incorporated herein by reference, discloses a hot melt ink composition comprising a triblock copolymer vehicle, and a dye or pigment.

U.S. Pat. No. 5,931,995 (Malhotra et al.), the disclosure of which is totally incorporated herein by reference, discloses an ink comprising (1) a liquid aldehyde, a liquid acid, or mixtures thereof, (2) a solid additive aldehyde compound, a solid additive acid compound, or mixtures thereof, (3) a lightfastness UV absorber, (4) a lightfastness antioxidant, and (5) a colorant.

U.S. Pat. No. 5,902,390 (Malhotra et al.), the disclosure of which is totally incorporated herein by reference, discloses an ink comprising (1) a liquid ketone, (2) a solid ketone, (3) a lightfastness UV absorber, (4) a lightfastness antioxidant, and (5) a colorant.

U.S. Pat. No. 5,876,492 (Malhotra et al.), the disclosure of which is totally incorporated herein by reference, discloses an ink comprising (1) a liquid ester vehicle, (2) a solid ester compound, (3) a liquid crystalline ester compound, (4) a UV absorber, (5) an antioxidant, and (6) a colorant.

U.S. Pat. No. 5,922,117 (Malhotra et al.), the disclosure of which is totally incorporated herein by reference, discloses an ink composition comprising (1) a liquid alcohol vehicle, (2) a solid alcohol compound, (3) a quaternary compound, (4) a lightfastness UV absorber, (5) a lightfastness antioxidant, and (6) a colorant.

U.S. Pat. No. 5,958,119 (Malhotra et al.), the disclosure of which is totally incorporated herein by reference, discloses an ink composition comprising (1) a liquid cyclic vehicle (2) a cyclic compound, (3) a liquid crystalline nitrile compound, (4) a lightfastness UV absorber, (5) a lightfastness antioxidant, and (6) a colorant.

U.S. Pat. No. 5,667,568 (Sacripante et al.), the disclosure of which is totally incorporated herein by reference, discloses an ink composition comprising a colorant and a bisamide with a viscosity of from about 1 centipoise to about 20 centipoise at a temperature of from about 125° to about 185° C., and which bisamide is of the formula

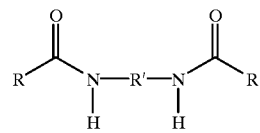

wherein R is an alkyl of from about 2 to about 30 carbon atoms or aryl, R' is an alkylene with from about 2 to about 30 carbon atoms, or R' is a polyalkyleneoxide with from about 2 to about 30 carbon atoms.

U.S. Pat. No. 5,698,017 (Sacripante et al.), the disclosure of which is totally incorporated herein by reference, discloses an ink composition comprising a colorant and a vehicle component, and which vehicle component comprises the condensation product of an organic acid and an amino alcohol.

U.S. Pat. No. 5,693,128 (Sacripante et al.), the disclosure of which is totally incorporated herein by reference, discloses an ink composition comprising a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 (Pontes et al.), the disclosure of which is totally incorporated herein by reference, discloses an ink composition comprising a colorant and a vehicle of a poly(alkylene oxide)-alkylate (I), a poly(alkylene oxide)-dialkylate (II), a polyoxa-alkanoate ester (III), or a polyoxa-alkanedioate diester (IV), and which ink possesses a viscosity of from about 1 centipoise to about 15 centipoise at a temperature of from about 125° C. to about 165° C., and which vehicle is of the formulas

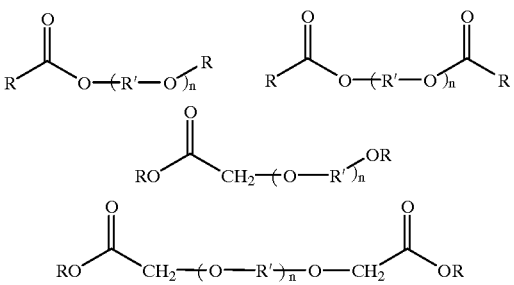

wherein R is alkyl, R' is an alkylene, or arylene, and n is an integer of from about 2 to about 20.

U.S. Pat. No. 5,989,325 (Sacripante et al.), the disclosure of which is totally incorporated herein by reference, discloses nonaqueous ink composition comprising a vehicle, colorant, and a hydrophobic gelling component.

U.S. Pat. No. 5,954,866 (Ohta et al.), the disclosure of which is totally incorporated herein by reference, discloses an ink composition for ink jet recording which can meet many property requirements for an ink composition used in ink jet recording and, in addition, can yield a good image on a recording medium having a layer comprising a water-soluble resin. An ink jet recording method using the same is also provided. An ink composition comprising a pigment as a colorant, an anionic surfactant having a polyoxyethylene group, a dispersant, and water is used to record an image on a recording medium having a layer comprising a water-soluble resin by ink jet recording.

U.S. Pat. No. 5,098,477 (Vieira et al.), the disclosure of which is totally incorporated herein by reference, discloses inks, particularly inks for ink jet printing, contain at least one compound of the formula

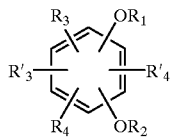

as a stabilizer. The compounds are in part novel and are suitable for use as light stabilizers for organic materials.

U.S. Pat. No. 5,693,126 (Vieira et al.), the disclosure of which is totally incorporated herein by reference, discloses a water-based ink composition which can provide a print having better water resistance, stably contains a colorant virtually insoluble or sparingly soluble in water, is less likely to cause clogging of a recording head, and can be advantageously used for ink jet recording. The water-based ink composition comprises a colorant which is either sparingly soluble or insoluble in water; a solid solvent which is solid at room temperature and soluble in water and can dissolve, in the form of a hot melt or aqueous solution thereof, the colorant and, can form a solid solution together with the colorant; and water.

U.S. Pat. No. 5,948,155 (Yui et al.), the disclosure of which is totally incorporated herein by reference, discloses an ink jet recording ink and an ink jet recording method, said ink jet recording ink comprising a water-insoluble coloring material, water, and at least one compound selected from the group consisting of a compound represented by formula (I) and polyglycerin:

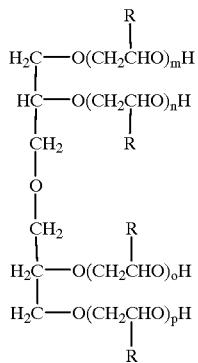

wherein R represents H or an alkyl group having 1 to 5 carbon atoms; m, n, o and p are all integers; and m+n+o+p is 0 to 200.

U.S. Pat. No. 5,897,940 (Malhotra), the disclosure of which is totally incorporated herein by reference, discloses a transparency comprising a supporting substrate, and thereover and thereunder two coatings, a first heat dissipating and fire resistant coating layer in contact with the substrate, and wherein said first coating comprises a binder with a melting point in the range of from about 100° C. to about 275° C. and a heat dissipating fire retardant component; and in contact with each of said first layers a second ink receiving coating layer thereover comprising a blend of a binder polymer, a cationic component capable of complexing with ink composition dyes, a lightfastness inducing agent, a filler, a biocide, and an ink spreading fluoro compound containing from 1 to about 25 fluorines and wherein said fluoro compound possesses a melting point of between about 50° C. and about 100° C., U.S. Pat. No. 5,538,550 (Yaegashi et al.), the disclosure of which is totally incorporated herein by reference, discloses a normally solid recording material that is heat-melted in a path defined by a nozzle leading to an ejection outlet and is imparted with a thermal energy from a heater corresponding to a recording signal to generate a bubble. As a result, a droplet of the recording material is ejected out of the ejection outlet under the action of the bubble while the bubble is caused to communicated with ambience The normally solid recording material preferably contains a colorant, a first heat-fusible solid substance having a melting point Tm of 36° to 150° C. and a boiling point Tb of 150° to 370° C., and a second heat-fusible solid substance having a melting point Tm and a solidifying point Tf satisfying a relationship of Tm−Tf≦30° C. The distance between the heater and the ejection outlet, the sectional size of the nozzle, and the thermal energy imparted by the heater are controlled to cause the bubble to communicate with ambience.

U.S. Pat. No. 3,953,218 (Pollard), the disclosure of which is totally incorporated herein by reference, discloses fatty acid amide coated pigments that are obtained and used to formulate with thermoplastic or thermoset materials. The colors of the pigments are fully developed and extremely high pigment loadings are obtained. The coated pigments are formed by admixing the pigment with melted fatty acid amide; solidifying the material by cooling it; grinding the material; and separating out the fines. The coated pigment particles are compounded with thermoplastic or thermoset materials by low shear means, such as, injection molding. An improved form of the coated pigments can be obtained by admixing the melted fatty acid amide and the pigment, extruding the admixture to form a creamy mass; solidifying and forming the creamy mass by passing it through cold and forming rollers, grinding the resultant wafer-like material; and separating out the fines. Liquid compositions of fatty acid amide coated pigments can be obtained by admixing pigment particles and a fatty acid amide which is liquid at room temperature or by admixing a fatty acid amide, pigment particles and a non-solvent diluent which is liquid at room temperature.

While known compositions and processes are suitable for their intended purposes, a need remains for acoustic phase change ink compositions suitable for ink jet printing. In addition, a need remains for phase change ink compositions that are compatible with a wide variety of plain papers and can generate photographic quality images on plain and coated papers. Further, a need remains for phase change ink compositions that generate high quality, lighffast, and water-fast images on plain papers. Additionally, a need remains for phase change ink jet inks that generate high quality, fast-drying images on a wide variety of plain papers at low cost with high quality text and high quality graphics, and wherein the dye may be retained on the paper surface while the ink vehicle can continue to spread within the paper structure. There is also a need for phase change ink jet inks that exhibit minimal feathering. In addition, there is a need for phase change ink jet inks that exhibit minimal intercolor bleed. Further, there is a need for phase change ink jet inks that exhibit excellent image permanence. Additionally, there is a need for phase change ink jet inks that are suitable for use in acoustic ink jet printing processes. A need also remains for phase change hot melt ink compositions suitable for ink jet printing processes wherein the substrate is heated prior to printing and is cooled to ambient temperature subsequent to printing (also known as heat and delay printing processes). In addition, a need remains for ink compositions suitable for ink jet printing wherein high optical densities can be achieved with relatively low dye concentrations. Further, a need remains for ink compositions suitable for ink jet printing wherein curling of the substrate subsequent to printing is minimized or avoided. Additionally, a need remains for phase change ink compositions that generate images with reduced susceptibility to creasing. There is also a need for phase change ink compositions that generate images of high transparency and light transmission. In addition, there is a need for phase change ink compositions that generate images with improved projection efficiency. Further, there is a need for phase change ink compositions with desirably low viscosities at the temperatures at which a hot melt ink jet printer is operated. Additionally, there is a need for phase change inks with desirably low acoustic loss values. A need also remains for phase change inks that can enable production of high quality images in a hot melt acoustic ink jet printer at temperatures of 100OC or less. In addition, a need remains for phase change inks that can generate images with high projection efficiency without the need for a fusing step subsequent to jetting. Further, a need remains for phase change inks for which the spherulite (spherical ink crystals) size is reduced. Additionally, a need remains for phase change inks that can generate images easily copied in a conventional photocopier because of a desirably low coefficient of friction of the images.

SUMMARY OF THE INVENTION

The present invention is directed to a phase change ink comprising (a) a carbamate or thiourea, said carbamate or thiourea having a melting point no higher than about 120° C. and an acoustic loss value of no more than about 100 decibels per millimeter, (b) a colorant, (c) a branched hydrocarbon with a number average molecular weight of no more than about 10,000 and a melting point or softening point of no more than about 120° C., (d) an optional plasticizer, (e) an optional alcohol having a melting point of less than about 90° C. and an acoustic loss value of no more than about 100 decibels per millimeter, (f) an optional lightfastness-imparting agent, and (g) an optional antioxidant.

DETAILED DESCRIPTION OF THE INVENTION

The ink compositions of the present invention contain a carbamate or a thiourea or a mixture thereof. Suitable carbamate and/or thiourea compounds have melting points typically no higher than about 120° C., and preferably no higher than about 100° C., and typically have melting points of no lower than about 25° C., and preferably no lower than about 60° C., although the melting point can be outside of these ranges. Suitable carbamates and thioureas typically have acoustic loss values of no more than about 100 decibels per millimeter, and preferably of no more than about 80 decibels per millimeter, although the acoustic loss value can be outside of this range. There is no necessary lower limit on acoustic loss value; it is believed that practically achievable lower limits are around 10 decibels per millimeter, although, if practically achievable, lower acoustic loss values are acceptable. While not being limited to any particular theory, it is believed that the carbamate and/or thiourea component of the ink can fill the pores of a porous print substrate, such as paper, and can enhance the spreading characteristics of the ink.

Examples of suitable carbamates include (1) tert-butyl carbamate (Aldrich 16,739-8), (2) tert-butyl-N-(tert-butoxycarbonyloxy) carbamate (Aldrich 41,279-1), (3) tert-butyl-N-(2-hydroxy-2-(hydroxyphenyl)-1-methylethyl) carbamate (Aldrich 40,429-2), (4) tert-butyl-(2,4-dinitrophenoxy) carbamate (Aldrich 33,305-0), (5) benzyl carbamate (Alfa Organics A11569), (6) benzyl N-hydroxycarbamate (Aldrich 32,327-6), (7) ethyldiphenyl carbamate (Aldrich 37,291-9), (8) 2-chloroethyl carbamate (Aldrich 40,429-2), (9) cyanomethyl-N,N-dimethyl dithiocarbamate (Aldrich 28,054-2), (10) 4,4'-methylene-bis (dibutyldithio carbamate) (Vanlube 7723, Vanderbilt Corporation), (11) potassium N-hydroxy methyl-N-methyl-dithiocarbamate (Busan 40 from Buckman Laboratories Inc.), (12) sodium dimethyl dithiocarbamate, (13) disodium ethylenebis-dithio carbamate, (14) diethylammonium diethyldithio carbamate (Alfa Organics A10458), (15) benzyl-tetrahydro-5-oxo-3-furanyl carbamate (Aldrich 41,924-9), (16) diethyidithiocarbamic acid ammonium salt (Aldrich 35,954-8), (17) diethyldithiocarbamic acid diethyl ammonium salt (Aldrich 31,811-6), (18) diethyldithiocarbamic acid sodium salt trihydrate (Aldrich 22,868-0), (19) 4-bromo-3,5-dimethylphenyl N-methylcarbamate (Aldrich 34,694-2), (20) butyl carbamate (Aldrich B9,080-7), (21) tert-butyl N-(3-aminopropyl) carbamate (Aldrich 43,699-2), (22) tert-butyl N-(3-hydroxypropyl) carbamate (Aldrich 41,644-4), (23) tert-butyl-N-(benzyloxy)-carbamate (Aldrich 40,769-0), (24) tert-butyl-N-hydroxycarbamate (Aldrich 22,615-7), (25) tert-butyl-N-allylcarbamate (Aldrich 42,233-9), (26) benzyl N-(2-hydroxyethyl) carbamate (Aldrich 40,790-9), (27) benzyl-N,N-dimethyldithiocarbamate (Aldrich 36,822-9), (28) ethyl N-methyl-N-phenylcarbamate (Aldrich 30,951-6), alkyl N-alkyl carbamates, including those that can be prepared by the reaction of an alkanol with an alkyl isocyanate in the presence of a 1,4-diazabicyclo (2.2.2) octane catalyst such as (29) octadecylcarbamoyl octadecanoate, (30) octadecylcarbamoyl hexadecanoate, (31) stearylcarbamoyl octoate, (32) stearylcarbamoyl dodecanoate, (33) stearylcarbamoyl hexadecanoate, (34) octadecylcarbamoyl octoate, (35) octadecylcarbamoyl laurate, and the like, as well as mixtures thereof.

Examples of suitable thioureas include (1) 1-allyl-2-thiourea (Aldrich 10,880-41), (2) 1-allyl-3-(2-hydroxyethyl)-2-thiourea (Aldrich A3,280-2), (3) 1-methyl-2-thiourea (Aldrich M8,460-7), (4) 1-methallyl-3-methyl-2-thiourea (Aldrich 19,046-2), (5) 1,3-dibutyl-2-thiourea (Aldrich D4,959-8), (6) 1,1,3,3-tetramethyl-2-thiourea (Aldrich 11,516-9), (7) N,N'-di-n-propyl thiourea (Alfa Organics A17217), (8) 1-benzyl-3-methyl-2-thiourea (Aldrich 27,550-6), and the like, as well as mixtures thereof.

The carbamate and/or thiourea is present in the ink in any desired or effective amount, typically at least about 1 percent by weight of the ink, and preferably at least about 15 percent by weight, and typically no more than about 98 percent by weight of the ink, and preferably no more than about 90 percent by weight of the ink, although the amount can be outside of these ranges.

The inks of the present invention also contain a colorant. The colorant can be a dye, a pigment, or a mixture thereof.

Suitable dyes and pigments include those capable of being dispersed or dissolved in the ink vehicle and compatible with the other ink components.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), carbon blacks such as REGAL 330® (Cabot), Carbon Black 5250, and Carbon Black 5750 (Columbia Chemical Company), and the like, as well as mixtures thereof.

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X34, available from BASF; Carta Black 2GT, available from Sandoz, Inc.; and the like, as well as mixtures thereof. Particularly preferred are solvent dyes, and within the class of solvent dyes, spirit soluble dyes are preferred because of their compatibility with the vehicles and dye leveling agents of the present invention. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like, as well as mixtures thereof.

The colorant is present in the ink in any desired or effective amount, typically at least about 0.5 percent by weight of the ink, and preferably at least about 1 percent by weight of the ink, and typically no more than about 20 percent by weight of the ink, and preferably no more than about 15 percent by weight of the ink, although the amount can be outside of these ranges.

The inks of the present invention also contain a branched hydrocarbon. The branched hydrocarbon typically has a number average molecular weight (as measured by vapor pressure osmometry) of at least about 300, preferably at least about 400, and more preferably at least about 500, and typically has a number average molecular weight of no more than about 10,000, preferably no more than about 5,000, and more preferably no more than about 3,000, although the molecular weight can be outside of these ranges. The branched hydrocarbon typically has a polydispersity of at least about 3, and typically has a polydispersity of no more than about 20, and preferably no more than about 12, although the polydispersity can be outside of these ranges. The branched hydrocarbon typically has a melting point (for crystalline materials) or a softening point (for amorphous or semicrystalline materials) of at least about 30° C., preferably at least about 35° C., and more preferably at least about 50° C., and typically has a melting point or softening point of no more than about 120° C., preferably no more than about 110° C., and more preferably no more than about 100° C., although the melting point can be outside of these ranges. The degree of branching (or average number of branches per molecule) in the branched hydrocarbon typically is at least about 4, and preferably at least about 5, and typically is no more than about 15, and preferably no more than about 10, although the degree of branching can be outside of these ranges. The hydrocarbon can be saturated or unsaturated, and can include cyclic moieties. In addition, oxidized hydrocarbons, such as polyethylene-based oxidized materials and microcrystalline-based oxidized materials can be used, as can unsaturated and branched hydrocarbon-like molecules using as a core cyclic compounds or dendrimer or arborols. Also suitable are homopolymers and copolymers prepared from monomers of the formula $RCH=CH_2$ wherein R is an alkyl group, typically with from about 1 to about 18 carbon atoms, and preferably with from about 3 to about 12 carbon atoms, although the number of carbon atoms can be outside of these ranges.

Examples of suitable branched hydrocarbons include VYBAR® 253, available from Baker Petrolite Corp., an alpha olefin with a number average molecular weight of about 520, a softening point of about 67° C. (measured by ASTM method D36), a polydispersity of about 8, and a degree of branching of from about 5 to about 10. This material is a polymer based on an ethylene structure having pendant hydrocarbon side chains, also referred to as a poly-α-olefin or a poly-1-alkene. Also suitable are VYBAR® 103, with a number average molecular weight of 2,800, VYBAR® 260, with a number average molecular weight of 2,600, and the VYBAR® X-series polymers, such as X-6044, X-6059, X-6028, and the like. Also suitable are oxidized hydrocarbons such as those available from Petrolite as polyethylene-based oxidized materials and microcrystalline-based oxidized materials, such as the CARDIS® and PETRONAUBA® materials.

The branched hydrocarbon is present in the ink in any desired or effective amount, typically at least about 1 percent by weight of the ink, preferably at least about 5 percent by weight of the ink, and more preferably at least about 10 percent by weight of the ink, and typically no more than about 75 percent by weight of the ink, and preferably no more than about 60 percent by weight of the ink, although the amount can be outside of these ranges.

Optionally, the inks of the present invention can also contain a plasticizer. While not being limited to any particular theory, it is believed that the plasticizer, when present, enables the inks of the present invention to maintain a low viscosity at temperatures at which the ink is a liquid (80° C., for example) without impairing the phase change behavior of the ink. Any desired or suitable plasticizer can be employed. One class of suitable plasticizer materials is that of high boiling hydrocarbon liquids. The high boiling hydrocarbon liquid has a boiling point typically of at least about 140° C., preferably at least about 145° C., and more preferably at least about 190° C., and typically has a boiling point of no more than about 310° C., although the boiling point can be outside of these ranges. The high boiling hydrocarbon liquid can be aliphatic or aromatic in character, or a mixture of aliphatic and aromatic distillates. Aliphatic distillates are typically coal-tar distillates; the chemical composition of such aliphatic distillates has not been precisely determined, but the molecular weight of the components is typically from about 170 to about 320, although the molecular weight can be outside of these ranges. Some aliphatic distillates also contain small amounts of aromatic components. Examples of suitable high boiling hydrocarbon liquids include MAGIESOL® 52, a highly refined petroleum distillate with a boiling point of from about 265 to about 305° C. and a vapor pressure of less than 1 mmHg at ambient temperature, commercially available from Magie Brothers Oil Company (Division of Pennzoil), Franklin Park, Illinois, MAGIESOL® 60, a highly refined petroleum distillate with essentially a zero vapor pressure at ambient temperature, MAGIESOL® 62, and the like. Also suitable as plasticizers are propylene carbonate, butyl benzyl phthalate, diethyl phthalate, 2-ethylhexyl diphenyl phosphate, tributyl phosphate, WITSOL® 50, available from Witco Inc,: ISO-PAR® E, F, G, H, I, J, K, L, M, and V, available from Exxon Chemical; PARAFLEX® HT-10, available from Gulf Inc. of Canada; SHELLFLEX® 210 and SHELLFLEX® 270, available from Shell Chemical Company; PARABASE®, available from Shell Chemical Company; mineral oil; vegetable oil, such as castor oil and its oxidized derivatives; peanut oil; coconut oil; sunflower seed oil; corn oil; rape seed oil; sesame oil; mineral spirits; fluorocarbon oils, such as DuPont's FREON® solvents and KRYTOX® oils; silicone oils, kerosene; carbon tetrachloride; toluene; drying oils such as linseed oil and tung oil, highly purified polypropylene glycol; butoxytriglycol; dibutyl phthalate; the phthalate ester plasticizers commercially available from Monsanto under the trade name SANTICIZER®, such as dioctyl phthalate, diundecyl phthalate, alkylbenzyl phthalate (SANTICIZER® 278), KP-140®, a triphenyl phosphate (commercially available from MC Corporation), MORFLEX® 150, a dicyclohexyl phthalate (commercially available from Morflex Chemical Company Inc.), trioctyl trimellitate (commercially available from Eastman Kodak Co.), and the like, as well as mixtures thereof.

When present, the optional plasticizer is present in the ink in any desired or effective amount, typically at least about 0.01 percent by weight of the ink, and preferably at least about 1 percent by weight of the ink, and typically no more than about 20 percent by weight of the ink, preferably no more than about 15 percent by weight of the ink, and more preferably no more than about 10 percent by weight of the ink, although the amount can be outside of these ranges.

Optionally, the inks of the present invention can also contain an alcohol. The alcohol has a melting point of less than about 90° C., and typically of at least about 25° C., although the melting point can be outside of this range. The alcohol typically has an acoustic loss value of less than about 100 decibels per millimeter, preferably less than about 60 decibels per millimeter, and more preferably less than about 40 decibels per millimeter, although the acoustic loss value can be outside of this range. There is no necessary lower limit on acoustic loss value; it is believed that practically achievable lower limits are around 10 decibels per millimeter, although, if practically achievable, lower acoustic loss values are acceptable. The alcohol typically has a boiling point of greater than about 150° C., and preferably of greater than about 170° C., and typically has a boiling point of no more than about 225° C., and preferably no more than about 200° C., although the boiling point can be outside of these ranges. While not being limited to any particular theory, it is believed that the alcohol, when present in the inks of the present invention, can increase the gloss of the resulting images and decrease creasing of the resulting images.

Examples of suitable alcohols include (A) cyclic alcohols, such as (1) cycloalkyl alcohols, wherein the number of carbon atoms in the alkyl group is from about 6 to about 12, such as cyclohexanol (Aldrich 10,589-9), cycloheptanol (Aldrich C9,880-2), and cyclododecanol (Aldrich C9,740-7), (2) 4-tert-butyl cyclohexanol (Aldrich B9,200-1), (3) 3-aminomethyl-3,5,5-trimethyl cyclohexanol (Aldrich 19,479-4), (4) 2,2,6,6-tetrachloro cyclohexanol (Aldrich 18,681-3), (5) cycloalkane methanols, wherein the number of carbon atoms in the alkane group is from about 5 to about 12, such as cyclopentane methanol (Aldrich 10,398-5), cyclohexane methanol (Aldrich C10,580-6), cycloheptane methanol (Aldrich 13,865-7), and cyclododecane methanol (Aldrich 11,224-0), (6) dicyclohexylmethanol (Aldrich 31,772-1), (7) 3-cyclohexyl-1-propanol (Aldrich 30,440-9), (8) 2-amino-3-cyclohexyl-1-propanol (Aldrich 42,161-8), (9) 2-(tert-butoxycarbonylamino)-3-cyclohexyl-1-propanol (Aldrich 42,169-3), (10) cycloalkane diols, wherein the number of carbon atoms in the alkane group is from about 5 to about 8, such as 1,2-cyclopentanediol (Aldrich 36,144-5), 1,3-cyclohexanediol (Aldrich C10,110-9), 1,2-cyclohexane diol (Aldrich 36,126-7; 14,171-2), 1,4-cyclohexane diol (Aldrich C10,120-6), and cyclooctanediol (Aldrich 17,903-5; 36,223-9), (11) cis-3,5-cyclohexadiene-1,2-diol (Aldrich 36,506-8), (12) p-methane-3,8-diol (Aldrich 38,404-6; 38,405-4), (13) cyclohexane dimethanol (Aldrich 12,559-8; 18,908-1), (14) 1,3-dioxane-5,5-dimethanol (Aldrich 22,062-0), (15) 3-cyclohexene-1,1-dimethanol (Aldrich 16,215-9), (16) piperidine methanol (Aldrich 15,522-5; 15,523-3), and the like; (B) linear alcohols, such as (1) alkyl alcohols, wherein the number of carbon atoms in the alkyl group is from about 6 to about 22, such as hexyl alcohol (Aldrich H1330-3), heptyl alcohol (Aldrich H280-5), octyl alcohol (Aldrich 29,324-5), nonyl alcohol (Aldrich 13,121-0), decylalcohol (Aldrich 23,976-3), undecyl alcohol (Aldrich U 100-1), 1-dodecanol (Aldrich 12,679-9), 1-tetradecanol (Aldrich 18,538-8), 1-pentadecanol (Aldrich 41,222-8), 1-hexadecanol (Aldrich 25,874-1), 1-eicosanol (Aldrich 23,449-4), and 1-docosanol (Aldrich 16,910-2), (2) alkane diols, wherein the number of carbon atoms in the alkane group is from about 5 to about 14, such as 1,5-pentane diol (Aldrich P770-3), 1,6-hexane diol (Aldrich H1,180-7), 1,7-heptane diol (Aldrich H220-1), 1,2-octane diol (Aldrich 21,370-5), 1,8-octane diol (Aldrich 330-3), 1,9-nonane diol (Aldrich N2,960-0), 1,10-decane diol (Aldrich D,120-3), 1,2-decane diol (Aldrich 26,032-0), 1,2-dodecane diol (Aldrich 21,372-1), 1,12-dodecane diol (Aldrich D22,130-9), 1,2-tetradecane diol (Aldrich 26,029-0), and 1,14-tetradecane diol (Aldrich 29,901-4), (3) 5-amino-i-pentanol (Aldrich 12,304-8), (4) nitromethane trispropanol (Aldrich 36,153-4), (5) 6-amino-i-hexanol (Aldrich A5,645-0), (6) 11-bromo-1-undecanol (Aldrich 18,413-6), (7) 12-bromo-1-dodecanol (Aldrich 22,467-7), (8) 2-methyl-2-propyl-1,3-propane diol (Aldrich M7,520-9), (9) 2,2-diethyl-1,3-propanediol (Aldrich D10,000-5), (10) 2-(hydroxymethyl)-1,3-propanediol (Aldrich 39,365-7), (11) 2,2,4-trimethyl-1,3-pentanediol (Aldrich 32,722-0), (12) 2-butyne-1,4-diol (Aldrich B10,320-9), (13) 3,6-dimethyl-4-octyne-3,6-diol (Aldrich 27,840-8), (14) 3,6-dithia-1,8-octanediol (Aldrich 23,533-4), (15) 2,4,7,9-tetramethyl-5-decyne-4,7-diol (Aldrich 27,838-6), and the like; (C) amino alcohols, such as (1) 2-(2-aminoethoxy) ethanol (Aldrich A5,405-9), (2) 2-(2-amino ethylamino) ethanol (Aldrich 12,758-2), (3) amino-1-propanol (Aldrich 23,886-4; 29,768-2; 19,217-1; A7,620-6; 23,984-4), (4) 2-amino-1-butanol (Aldrich A4,380-6), (5) 4-amino-1-butanol (Aldrich 17,833-0), (6) 2-amino-3-methyl-1-butanol (Aldrich 18,483-7), (7) 2-amino-1-hexanol (Aldrich 23,767-1), (8) N-(tert-butoxycarbonyl) leucinol (Aldrich 44,119-8), and the like; (D) aromatic alcohols, such as (1) alkyl benzyl alcohols, wherein the number of carbon atoms in the alkyl group is from 0 to about 8, such as benzyl alcohol (Aldrich 10,800-6), 3-methyl benzyl alcohol (Aldrich 18,821-2), 4-methyl benzyl alcohol (Aldrich 12,780-9), 2-phenyl benzyl alcohol (Aldrich 18,882-4), and 2-phenethyl benzyl alcohol (Aldrich 18,478-0), (2) alkoxy and aryloxy benzyl alcohols, wherein the number of carbon atoms in the alkoxy group is from about 1 to about 4, such as 2-methoxy benzyl alcohol (Aldrich M1,080-8), 3-methoxybenzyl alcohol (Aldrich M1,100-6), 4-methoxy benzyl alcohol (Aldrich 13,690-5), 2-ethoxy benzyl alcohol (Aldrich 19,066-7), 4-ethoxy benzyl alcohol (Aldrich 19,047-0), and 4-butoxy benzyl alcohol (Aldrich 18,424-1), and wherein the number of carbon atoms in the aryloxy groups is from about 6 to about 8, such as 3-benzyloxy benzyl alcohol, (3) alkyl alkyl benzyl alcohols, wherein the number of carbon atoms in each alkyl group, independently, is from about 1 to about 4, such as 2,4-dimethyl benzyl alcohol (Aldrich 18,878-6), 2,5 dimethyl benzyl alcohol (Aldrich 18,932-4), 3,5-dimethyl benzyl alcohol (Aldrich 19,999-0), and 3,4-dimethyl benzyl alcohol (Aldrich 18,879-4), (4) 2-amino-3-methyl benzyl alcohol (Aldrich 33,419-7), (5) alkoxy alkoxy benzyl alcohols, wherein the number of carbon atoms in each alkoxy group, independently, is from about 1 to about 4, such as 2,4-dimethoxy benzyl alcohol (Aldrich 15,963-8), 3,5-dimethoxy benzyl alcohol (Aldrich 19,165-5), 2,3-dimethoxy benzyl alcohol (Aldrich 12,631-4), 3-ethoxy-4-methoxy benzyl alcohol (Aldrich 30,790-4), and 4-ethoxy-3-methoxy benzyl alcohol (Aldrich 18,914-6), (6) 2-hydroxy-3-methoxy benzyl alcohol (Aldrich 30,596-0), (7) 3,4,5-trimethoxy benzyl alcohol (Aldrich T7,000-9), and the like: (E) phenyl alcohol derivatives, such as (1) phenyl-propanol (Aldrich P3,080-2; 14,085-6), (2) 3-(4-hydroxy phenyl)-1-propanol (Aldrich 19,741-6), (3) 1-phenyl-1-butanol (Aldrich 31,731-4), (4) 2-amino-1-phenyl ethanol (Aldrich A7,240-5), (5) 3,4-dimethoxy phenethyl alcohol (Aldrich 19,765-3), (6) 2-phenyl-1,2-propane diol (Aldrich 21,376-4), (7) 3-phenoxy-1,2-propane diol (Aldrich 10,819-7), (8) 3-methoxy catechol (Aldrich M1,320-3), (9) benzhydrol (Aldrich B,485-4), (10) methyl benzhydrol (Aldrich 18,995-2; 18,996-0), (11) phenethylalcohol (Aldrich P1,362-2), (12) 4-methoxy phenethyl alcohol (Aldrich 15,418-0), (13) 2-hydroxy phenethyl alcohol (Aldrich 18,824-7; 19,902-8), (14) 2-amino phenethyl alcohol (Aldrich 19,260-0), and the like, as well as mixtures thereof, When present, the optional alcohol is present in the ink in any desired or effective amount, typically at least about 1 percent by weight of the ink, and preferably at least about 7 percent by weight of the ink, and typically no more than about 69 percent by weight of the ink, and preferably no more than about 60 percent by weight, although the amount can be outside of these ranges.

Optionally, the inks of the present invention can also contain a lightfastness-imparting agent. While not being limited to any particular theory, it is believed that these agents, when present, primarily protect the images generated with the inks from ultraviolet light degradation.

Examples of suitable lightfastness-imparting agents include (1) N-p-ethoxycarbonylphenyl)-N'-ethyl-N'-phenylformadine (Givaudan Corporation), (2) 1,1-(1,2-ethane-diyl) bis(3,3,5,5-tetramethyl piperazinone) (Goodrich Chemicals), (3) 2,2,4-trimethyl-1,2-hydroquinoline (Mobay Corporation), (4) 6-ethoxy-1,2-dihydro-2,2,4-trimethylquinoline (Monsanto-Chemicals), (5) 2,4,6-tris-(N-1,4-dimethylpentyl-4-phenylenediamino)-1,3,5-triazine (Uniroyal Corporation), (6) 2-(4-benzoyl-3-hydroxy phenoxy)ethylacrylate, (7) 2-dodecyl-N-(2,2,6,6-tetramethyl-4-piperidinyl) succinimide, (8) 2-dodecyl-N-(1,2,2,6,6-pentamethyl-4-piperidinyl)succinimide, (9) N-(1-acetyl-2,2,6,6-tetramethyl-4-piperidinyl)-2-dodecyl succinimide, all four available from Aldrich Chemicals, (10) (2,2,6,6-tetramethyl-4-piperidinyl/β,β,β',β'-tetramethyl-3,9-(2,4,8, 10-tetraoxospiro(5,5)-undecane) diethyl)-1,2,3,4-butane tetracarboxylate, (1 1) (1,2,2,6,6-pentamethyl-4-piperidinyl/β,β,β',β'-tetramethyl-3,9-(2,4,8, 10-tetraoxo-spiro-(5,5)undecane) diethyl)-1,2,3,4-butanetetracarboxylate, (12) (2,2,6,6-tetra methyl-4-piperidinyl)-1,2,3,4-butane tetracarboxylate, (13) nickel dibutyl dithio carbamate (available as UV-Chek AM-105 from Ferro Corporation), and the like, as well as mixtures thereof.

When present, the lightfastness-imparting agent is present in the ink in any desired or effective amount, typically at least about 0.25 percent by weight of the ink, and preferably at least about 1 percent by weight of the ink, and typically no more than about 5 percent by weight of the ink, although the amount can be outside of these ranges.

Optionally, the inks of the present invention can also contain an antioxidant. While not being limited to any particular theory, it is believed that the antioxidants, when present in the inks of the present invention, primarily protect the inks from thermal degradation.

Examples of suitable antioxidants include (1) antimony dialkyl phosphorodithioate (available from Vanderbilt Corporation), (2) molybdenum oxysulfide dithio carbamate (available from Vanderbilt Corporation), (3) nickel-bis(o-ethyl (3,5-di-tert-butyl-4-hydroxybenzyl) phosphonate) (Ciba Geigy Corporation), (4) tetrasodium-N-(1,2-dicarboxyethyl)-N-octadecyl sulfosuccinamate (American Cyanamid Corporation), and the like, as well as mixtures thereof.

When present, the antioxidant is present in the ink in any desired or effective amount, typically at least about 0.25 percent by weight of the ink, and preferably at least about 1 percent by weight of the ink, and preferably no more than about 5 percent by weight of the ink, although the amount can be outside of these ranges.

The ink compositions of the present invention typically have melting points no lower than about 50° C., preferably no lower than about 55° C., and more preferably no lower than about 60° C., and typically have melting points no higher than about 150° C., preferably no higher than about 120° C., more preferably no higher than about 100° C., and even more preferably no higher than about 90° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 140° C., although the jetting temperature can be outside of these ranges) typically of no more than about 25 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

Hardness is a property of solids and plastics that is defined by their solidity and firmness as measured by their resistance to indentation by an indenter of fixed shape and size under a static load. The hardness of images can be measured with a Digital-Pencil style Durometer, Model 211B-00 PTC, obtained from Pacific Transducer Corporation, using ASTM Standard specifications D2240 for resistance to penetration with a conical (30 degrees included angle) indenter and applying a 1 kilogram load. The hardness range for materials as measured with this instrument is from about 1 to about 100, the latter being the highest measurable value. It is believed that the images generated with the inks of the present invention, after cooling to ambient temperature (typically from about 20 to about 25° C., although ambient temperature can be outside of this range) will exhibit hardness values of at least about 50 or more, with no necessary upper limit (although practical upper limits may be around 90).

The inks of the present invention typically undergo, upon freezing on the print substrate, a change from a liquid state to a solid state in a period of less than about 100 milliseconds, preferably less than about 50 milliseconds, and more preferably less than about 10 milliseconds, although the time can be outside of these ranges. There is no necessary lower limit on this period of time for the inks, it is believed that practically achievable lower limits are around 5 milliseconds, although, if practically achievable, lower periods of time are acceptable.

The inks of the present invention typically exhibit acoustic loss values of no more than about 100 decibels per millimeter, preferably no more than about 80 decibels per millimeter, more preferably no more than about 60 decibels per millimeter, and even more preferably no more than about 40 decibels per millimeter, although the acoustic loss value can be outside of these ranges. There is no necessary lower limit on acoustic loss value for the inks; it is believed that practically achievable lower limits are around 10 decibels per millimeter, although, if practically achievable, lower acoustic loss values are acceptable. Acoustic loss can be measured by placing a sample of the material to be measured between two transducers with the temperature set at about 150° C. The samples are allowed to equilibrate at 150° C. for five minutes. The two transducers are then brought together to maximize the acoustic signal. The amplitude and the position of the signals are recorded. The two transducers are then separated by a distance varying from about 25.4 microns to about 125.4 microns, recording each time the amplitude and the position of the signal. Preferably, each measurement is performed three times, and three samples of the same material are measured. The attenuation decibels per millimeter is then calculated by ratioing the amplitude values obtained at different separation distances.

The inks of the present invention exhibit substantial transparency. The images generated with the inks typically exhibit haze values of no more than about 40, preferably no more than about 10, and preferably no more than about 5, although the haze value can be outside of these ranges. There is no necessary lower limit on haze values. Haze values can be measured on images printed with the ink on uncoated polyester, such as MYLAR®, with a Haze meter XL-211, HAZEGARD® System obtained from Pacific Scientific Company.

The inks of the present invention generate images with desirable crease resistance. The images generated with the inks typically exhibit crease values of no more than about 0.6 millimeters, preferably no more than about 0.2 millimeters, and more preferably no more than about 0.1 millimeters, although the crease value can be outside of these ranges. There is no necessary lower limit on crease values; ideally, this value is zero. The average width of the creased image can be measured by printing an image on paper, followed by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer. The crease value can also be reported in terms of area, especially when the image is sufficiently hard to break unevenly on creasing. Measured in terms of area, crease values of 60 millimeters correspond to about 0.6, crease values of 40 millimeters correspond to about 0.4, crease values of 10 millimeters correspond to about 0.1, and the like.

The inks of the present invention can generate images with desirably high degrees of gloss. The images generated with the inks typically exhibit gloss values of from about 80 to about 85 (as measured with a Micro-Gloss 75, available from BYK Gardner), although the gloss value can be outside of this range.

The inks of the present invention can be prepared by any suitable method. For example, a colored phase change ink can be prepared by mixing the ink ingredients and heating the resulting mixture to a temperature of about 120° C. and stirring for a period of about 60 minutes until the mixture forms a homogeneous solution, followed by cooling to 25° C.

The inks of the present invention are particularly suitable for printing processes wherein the substrate, such as paper, transparency material, or the like, is heated during the printing process. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside of these ranges.

The present invention is also directed to a process which entails incorporating an ink of the present invention into an ink jet printing apparatus, melting the ink, and causing droplets of the melted ink to be ejected in an imagewise pattern onto a recording sheet. In one preferred embodiment, the printing apparatus employs an acoustic ink jet process, wherein droplets of the ink are caused to be ejected in imagewise pattern by acoustic beams, In a particularly preferred embodiment, the printing apparatus employs an acoustic ink jet printing process wherein droplets of the ink are formed by acoustic beams without imparting a substantial velocity component toward the print medium, using a droplet forming force that is sufficient only to form the ink droplets, and the printing process further comprises generating an electric field to exert an electrical force different from the droplet forming force on the ink droplets to move the ink droplets toward the print medium, and controlling the electrical force exerted on the formed complete ink droplets by the electric field.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments, All parts and percentages are by weight unless otherwise indicated.

EXAMPLE I

An octadecylcarbamoyl octadecanoate ink vehicle is prepared as follows. In a 500 milliliter Erlenmeyer flask with a magnetic stirrer, 82 grams of 1-octadecanol and 0.1 gram of 1,4-diazabicyclo(2.2.2)octane (catalyst) are mixed with 200 grams of toluene and the resultant mixture is heated to 80° C. To this heated solution, 100 grams of octadecyl isocyanate is slowly added. The mixture is heated for 3 hours at 80° C., after which the mixture is allowed to cool to room temperature. The product precipitates out of solution, and is filtered and recrystallized from isopropyl alcohol to yield the white solid product with a melting point of 84° C.

A black phase change ink is prepared by mixing 70 percent by weight of octadecylcarbamoyl octadecanoate ($C_{18}H_{37}NHCO_2C_{18}H_{37}$; melting point 84° C.; viscosity at 150° C. 3.1 centipoise), 25 percent by weight VYBARO 253 (viscosity at 150° C. 2.6 centipoise; softening point 67° C.), and 5 percent by weight black colorant (Specandle Black C-696, commercially available from Spectra Color Corp). The mixture is heated to a temperature of about 120° C. and stirred for a period of about 60 minutes until it forms a homogeneous solution, followed by cooling to 25° C. It is believed that the resulting solid black ink will have a viscosity of less than 6 centipoise at 150° C.

The ink thus prepared is incorporated into an acoustic ink jet printing test fixture utilizing the ejection mechanism disclosed in *J. Appl. Phys.*, 65(9), 1 May 1989, and references therein, the disclosures of each of which are totally incorporated herein by reference. A jetting frequency of 160 MHz is used to generate drops of about 2 picoliters, up to 12 drops per pixel at 600 spi. Images are generated on paper and on uncoated MYLAR® substrates. It is believed that the images thus generated will exhibit excellent color quality, low crease and haze values, and high gloss.

EXAMPLE II

An octadecylcarbamoyl octoate ink vehicle is prepared as follows. In a 500 milliliter Erlenmeyer flask with a magnetic stirrer, 82 grams of 1-octanol and 0.1 gram of 1,4-diazabicyclo(2.2.2)octane (catalyst) are mixed with 200 grams of toluene and the resultant mixture is heated to 80° C. To this heated solution, 100 grams of octadecyl isocyanate is slowly added. The mixture is heated for 3 hours at 80° C., after which the mixture is allowed to cool to room temperature. The product precipitates out of solution, and is filtered and recrystallized from isopropyl alcohol to yield the white solid product with a melting point of 66° C.

A blue phase change ink is prepared by mixing 60 percent by weight of octadecylcarbamoyl octoate ($C_{18}H_{37}NHCO_2C_8H_{17}$; melting point 66° C.; viscosity at 150° C. 2.2 centipoise), 36 percent by weight WBAR® 253, 0.5 percent by weight 2-dodecyl-N-(2,2,6,6-tetramethyl-4-piperidinyl) succinimide (UV absorber; Aldrich 41,317-8), 0.5 percent by weight tetrasodium-N-(1,2-dicarboxyethyl)-N-octadecyl sulfosuccinamate (antioxidant; Aerosol 22N, American Cyanamid Corporation), and 3 percent by weight blue colorant (Macrolex Blue 3R, Bayer). The mixture is heated to a temperature of about 120° C. and stirred for a period of about 60 minutes until it forms a homogeneous solution, followed by cooling to 25° C. It is believed that the resulting solid blue ink will have a viscosity of less than 6 centipoise at 150° C.

The ink thus prepared is incorporated into an acoustic ink jet printing test fixture as described in Example I and images are generated on paper and on uncoated MYLAR® substrates. It is believed that the images thus generated will exhibit excellent color quality, low crease and haze values, and high gloss.

EXAMPLE III

A yellow phase change ink is prepared by mixing 41.5 percent by weight of stearyl erucamide ($CH_3(CH_2)_7C_2H_2(CH_2)_{11}CONH(CH_2)_{17}CH_3$; (KEMAMIDE® E-180, commercially available from Witco; melting point 74° C.; viscosity at 150° C. 4.67 centipoise), 30 percent by weight of octadecylcarbamoyl octadecanoate (prepared as described in Example I), 25 percent by weight of VYBAR® 253, 0.5 percent by weight 2-dodecyl-N-(2,2,6,6-tetramethyl-4-piperldinyl) succinimide (UV absorber, Aldrich 41,317-8), 0.5 percent by weight tetrasodium-N-(1,2-dicarboxyethyl)-N-octadecyl sulfosuccinamate (antioxidant; Aerosol 22N, American Cyanamid Corporation), and 2.5 percent by weight of yellow colorant (Spectra oil yellow 2635, Spectra Color Corp.). The resulting mixture is heated to a temperature of about 100° C. and stirred for a period of about 60 minutes until it forms a homogeneous solution, followed by cooling to 25° C., It is believed that the resulting solid yellow ink will have a viscosity of less than 6 centipoise at 150° C.

The ink thus prepared is incorporated into an acoustic ink jet printing test fixture as described in Example I and images are generated on paper and on uncoated MYLAR® substrates. It is believed that the images thus generated will exhibit excellent color quality, low crease and haze values, and high gloss.

EXAMPLE IV

An octadecylcarbamoyl laurate ink vehicle is prepared as follows. In a 500 milliliter Erlenmeyer flask with a magnetic stirrer, 82 grams of 1-lauryl alcohol and 0.1 gram of 1,4-diazabicyclo(2.2.2)octane (catalyst) are mixed with 200 grams of toluene and the resultant mixture is heated to 80° C. To this heated solution, 100 grams of octadecyl isocyanate is slowly added. The mixture is heated for 3 hours at 80° C., after which the mixture is allowed to cool to room temperature. The product precipitates out of solution, and is filtered and recrystallized from isopropyl alcohol to yield the white solid product with a melting point of 83° C.

A red phase change ink is prepared by mixing 40.5 percent by weight of stearyl erucamide, 30 percent by weight of octadecylcarbamoyl laurate ($C_{18}H_{37}NHCO_2C_{16}H_{33}$; melting point 83° C.; viscosity at 150° C. 3.4 centipoise), 25 percent by weight of VYBAR® 253, 0.5 percent by weight 2-dodecyl-N-(2,2,6,6-tetramethyl-4-piperidinyl) succinimide (UV absorber; Aldrich 41,317-8), 0.5 percent by weight tetrasodium-N-(1,2-dicarboxyethyl)-N-octadecyl sulfosuccinamate (antioxidant; Aerosol 22N, American Cyanamid Corporation), and 3.5 percent by weight of red colorant (Sudan Red, BASF). The resulting mixture is heated to a temperature of about 100° C. and stirred for a period of about 60 minutes until it forms a homogeneous solution, followed by cooling to 25° C. It is believed that the resulting solid red ink will have a viscosity of less than 6 centipoise at 150° C.

The ink thus prepared is incorporated into an acoustic ink jet printing test fixture as described in Example I and images are generated on paper and on uncoated MYLAR® substrates. It is believed that the images thus generated will exhibit excellent color quality, low crease and haze values, and high gloss.

EXAMPLE V

A black phase change ink composition is prepared by mixing 50 percent by weight of octadecylcarbamoyl octadecanoate (prepared as described in Example I), 20 percent by weight of 1,3-dibutylthiourea (Aldrich D4,959-8; melting point 64° C.), 25 percent by weight of VYBAR® 253, and 5 percent by weight of black colorant (Specandle Black C-696, Spectra Color Corp.). The mixture is heated to a temperature of about 120° C. and stirred for a period of about 60 minutes until it forms a homogeneous solution, followed by cooling to 25° C., It is believed that the resulting solid black ink will have a viscosity of less than 6 centipoise at 150° C.

The ink thus prepared is incorporated into an acoustic ink jet printing test fixture as described in Example I and images are generated on paper and on uncoated MYLAR® substrates. It is believed that the images thus generated will exhibit excellent color quality, low crease and haze values, and high gloss.

EXAMPLE VI

A black phase change ink composition is prepared by mixing 50 percent by weight of 1,3-dibutylthiourea (Aldrich D4,959-8; melting point 64° C.), 10 percent by weight 2,2-diethyl-1,3-propanediol (alcohol compound; Aldrich D10,000-5; melting point 46° C.), 10 percent by weight of butyl benzyl phthalate (plasticizer), 25 percent by weight of VYBAR® 253, and 5 percent by weight of black colorant (Specandle Black C-696, Spectra Color Corp.). The mixture is heated to a temperature of about 120° C. and stirred for a period of about 60 minutes until it forms a homogeneous solution, followed by cooling to 25° C. It is believed that the resulting solid black ink will have a viscosity of less than 6 centipoise at 150° C.

The ink thus prepared is incorporated into an acoustic ink jet printing test fixture as described in Example I and images are generated on paper and on uncoated MYLAR® substrates. It is believed that the images thus generated will exhibit excellent color quality, low crease and haze values, and high gloss.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A phase change ink comprising (a) a carbamate or thiourea, said carbamate or thiourea having a melting point of no higher than about 120° C. and an acoustic loss value of no more than about 100 decibels per millimeter, (b) a colorant, (c) a branched hydrocarbon with a number average molecular weight of no more than about 10,000 and a melting point or softening point of no more than about 120° C., (d) an optional plasticizer, (e) an optional alcohol having a melting point of less than about 90° C. and an acoustic loss value of no more than about 100 decibels per millimeter, (f) an optional lightfastness-imparting agent, and (g) an optional antioxidant.

2. An ink composition according to claim 1 wherein the carbamate or thiourea is a carbamate.

3. An ink composition according to claim 1 wherein the carbamate or thiourea is a thiourea.

4. An ink composition according to claim 1 wherein the carbamate or thiourea is a mixture of a carbamate and a thiourea.

5. An ink composition according to claim 1 wherein the carbamate or thiourea is tert-butyl carbamate, tert-butyl-N-(tert-butoxycarbonyloxy) carbamate, tert-butyl-N-(2-hydroxy-2-(hydroxyphenyl)-1-methylethyl) carbamate, tert-butyl-(2,4-dinitrophenoxy) carbamate, benzyl carbamate, benzyl N-hydroxycarbamate, ethyldiphenyl carbamate, 2-chloroethyl carbamate, cyanomethyl-N,N-dimethyl dithiocarbamate, 4,4'-methylene-bis(dibutyldithio carbamate), potassium N-hydroxy methyl-N-methyl-dithiocarbamate, sodium dimethyl dithiocarbamate, disodium ethylenebis-dithio carbamate, diethylammonium diethyldithio carbamate, benzyl-tetrahydro-5-oxo-3-furanyl carbamate, diethyldithiocarbamic acid ammonium salt, diethyldithiocarbamic acid diethyl ammonium salt, diethyidithiocarbamic acid sodium salt trihydrate, 4-bromo-3,5-dimethylphenyl N-methylcarbamate, butyl carbamate, tert-butyl N-(3-aminopropyl) carbamate, tert-butyl N-(3-hydroxypropyl) carbamate, tert-butyl-N-(benzyloxy)- carbamate, tert-butyl-N-hydroxycarbamate, tert-butyl-N-allylcarbamate, benzyl N-(2-hydroxyethyl)carbamate, benzyl-N,N-dimethyldithiocarbamate, ethyl N-methyl-N-phenylcarbamate, octadecylcarbamoyl octadecanoate, octadecylcarbamoyl hexadecanoate, stearylcarbamoyl octoate, stearylcarbamoyl dodecanoate, stearylcarbamoyl hexadecanoate, octadecylcarbamoyl octoate, octadecylcarbamoyl laurate, 1-allyl-2-thiourea, 1-allyl-3-(2-hydroxyethyl)-2-thiourea, 1-methyl-2-thiourea, 1-methallyl-3-methyl-2-thiourea, 1,3-dibutyl-2-thiourea, 1,1,3,3-tetramethyl-2-thiourea, N,N'-di-n-propyl thiourea, 1-benzyl-3-methyl-2-thiourea, or a mixture thereof.

6. An ink composition according to claim 1 wherein the carbamate or thiourea has a melting point of no lower than about 25° C.

7. An ink composition according to claim 1 wherein the carbamate or thiourea is present in the ink in an amount of at least about 1 percent by weight and wherein the carbamate or thiourea is present in the ink in an amount of no more than about 98 percent by weight.

8. An ink composition according to claim 1 wherein the carbamate or thiourea is present in the ink in an amount of at least about 15 percent by weight and wherein the carbamate or thiourea is present in the ink in an amount of no more than about 90 percent by weight.

9. An ink composition according to claim 1 wherein the colorant is a pigment.

10. An ink composition according to claim 1 wherein the colorant is a dye.

11. An ink composition according to claim 1 wherein the colorant is present in the ink in an amount of at least about 0.5 percent by weight of the ink and wherein the colorant is present in the ink in an amount of no more than about 20 percent by weight of the ink.

12. An ink composition according to claim 1 wherein the colorant is present in the ink in an amount of at least about 1 percent by weight of the ink and wherein the colorant is present in the ink in an amount of no more than about 15 percent by weight of the ink.

13. An ink composition according to claim 1 wherein the branched hydrocarbon has a number average molecular weight of at least about 300.

14. An ink composition according to claim 1 wherein the branched hydrocarbon has a number average molecular weight of at least about 400 and wherein the branched hydrocarbon has a number average molecular weight of no more than about 5,000.

15. An ink composition according to claim 1 wherein the branched hydrocarbon has a number average molecular weight of at least about 500 and wherein the branched hydrocarbon has a number average molecular weight of no more than about 3,000.

16. An ink composition according to claim 1 wherein the branched hydrocarbon has a polydispersity of at least about 3 and wherein the branched hydrocarbon has a polydispersity of no more than about 20.

17. An ink composition according to claim 1 wherein the branched hydrocarbon has a melting point or softening point of at least about 30° C.

18. An ink composition according to claim 1 wherein the branched hydrocarbon has a melting point or softening point of at least about 35° C. and wherein the branched hydrocarbon has a melting point or softening point of no more than about 110° C.

19. An ink composition according to claim 1 wherein the branched hydrocarbon has a melting point or softening point of at least about 50° C. and wherein the branched hydrocarbon has a melting point or softening point of no more than about 100° C.

20. An ink composition according to claim 1 wherein the branched hydrocarbon has a degree of branching of at least about 4 and wherein the branched hydrocarbon has a degree of branching of no more than about 15.

21. An ink composition according to claim 1 wherein the branched hydrocarbon has a degree of branching of at least about 5 and wherein the branched hydrocarbon has a degree of branching of no more than about 10.

22. An ink composition according to claim 1 wherein the branched hydrocarbon is a poly-α-olefin.

23. An ink composition according to claim 1 wherein the branched hydrocarbon is present in the ink in an amount of at least about 1 percent by weight of the ink, and wherein the branched hydrocarbon is present in the ink in an amount of no more than about 75 percent by weight of the ink.

24. An ink composition according to claim 1 wherein the branched hydrocarbon is present in the ink in an amount of at least about 5 percent by weight of the ink, and wherein the branched hydrocarbon is present in the ink in an amount of no more than about 60 percent by weight of the ink.

25. An ink composition according to claim 1 containing a plasticizer, wherein the plasticizer is present in the ink in an amount of at least about 0.01 percent by weight of the ink, and wherein the plasticizer is present in the ink in an amount of no more than about 20 percent by weight of the ink.

26. An ink composition according to claim 1 containing a plasticizer, wherein the plasticizer is present in the ink in an amount of at least about 1 percent by weight of the ink, and wherein the plasticizer is present in the ink in an amount of no more than about 15 percent by weight of the ink.

27. An ink composition according to claim 1 containing a hydrocarbon liquid plasticizer, wherein the hydrocarbon liquid has a boiling point of at least about 140° C.

28. An ink composition according to claim 27 wherein the hydrocarbon liquid has a boiling point of no more than about 310° C.

29. An ink composition according to claim 1 containing a plasticizer which is are propylene carbonate, butyl benzyl phthalate, diethyl phthalate, 2-ethylhexyl diphenyl phosphate, tributyl phosphate, dibutyl phthalate, dioctyl phthalate, diundecyl phthalate, alkylbenzyl phthalate, triphenyl phosphate, dicyclohexyl phthalate, trioctyl trimellitate, or a mixture thereof.

30. An ink composition according to claim 1 containing an alcohol with a melting point of less than about 90° C. and an acoustic loss value of less than 100 decibels per millimeter, wherein the alcohol has a melting point of at least about 25° C.

31. An ink composition according to claim 1 containing an alcohol with a melting point of less than about 90° C. and an acoustic loss value of less than 100 decibels per millimeter, wherein the alcohol has a boiling point of greater than about 150° C., and wherein the alcohol has a boiling point of no more than about 225° C.

32. An ink composition according to claim 1 containing an alcohol with a melting point of less than about 90° C. and an acoustic loss value of less than 100 decibels per millimeter, wherein the alcohol is cyclohexanol, cycloheptanol, cyclododecanol, 4tert-butyl cyclohexanol, 3-aminomethyl-3,5,5-trimethyl cyclohexanol, 2,2,6,6-tetrachloro cyclohexanol, cyclopentane methanol, cyclohexane methanol, cycloheptane methanol, cyclododecane methanol, dicyclohexylmethanol, 3-cyclohexyl-1-propanol, 2-amino-3-cyclohexyl-1-propanol, 2-(tert-butoxycarbonylamino)-3-cyclohexyl-1-propanol, 1,2- cyclopentanediol, 1,3-cyclohexanediol, 1,2-cyclohexane diol, 1,4-cyclohexane diol, cyclooctanediol, cis-3,5-cyclohexadiene-1,2-diol, p-methane-3,8-diol, cyclohexane dimethanol, 1,3-dioxane-5,5-dimethanol, 3-cyclohexene-1,1-dimethanol, piperidine methanol, hexyl alcohol, heptyl alcohol, octyl alcohol, nonyl alcohol, decylalcohol, undecyl alcohol, 1-dodecanol, 1-tetradecanol, 1-pentadecanol, 1-hexadecanol, 1-eicosanol, 1-docosanol, 1,5-pentane diol, 1,6-hexane diol, 1,7-heptane diol, 1,2-octane diol, 1,8-octane diol, 1,9-nonane diol, 1,10-decane diol, 1,2-decane diol, 1,2-dodecane diol, 1,12-dodecane diol, 1,2-tetradecane diol, 1,14-tetradecane diol, 5-amino-1-pentanol, nitromethane trispropanol, 6-amino-1-hexanol, 11-bromo-1-undecanol, 12-bromo-1-dodecanol, 2-methyl-2-propyl-1,3-propane diol, 2,2-diethyl-1,3-propanediol, 2-(hydroxymethyl)-1,3-propanediol, 2,2,4-trimethyl-1,3-pentanediol, 2-butyne-1,4-diol, 3,6-dimethyl-4-octyne-3,6-diol, 3,6-dithia-1,8-octanediol, 2,4,7,9-tetramethyl-5-decyne-4,7-diol, 2-(2-aminoethoxy)ethanol, 2-(2-amino ethylamino) ethanol, amino-1-propanol, 2-amino-1-butanol, 4-amino-1-butanol, 2-amino-3-methyl-1-butanol, 2-amino-1-hexanol, N-(tert-butoxycarbonyl) leucinol, benzyl alcohol, 3-methyl benzyl alcohol, 4-methyl benzyl alcohol, 2-phenyl benzyl alcohol, 2-phenethyl benzyl alcohol, 2-methoxy benzyl alcohol, 3-methoxybenzyl alcohol, 4-methoxy benzyl alcohol, 2-ethoxy benzyl alcohol, 4-ethoxy benzyl alcohol, 4-butoxy benzyl alcohol, 3-benzyloxy benzyl alcohol, 2,4-dimethyl benzyl alcohol, 2,5 dimethyl benzyl alcohol, 3,5-dimethyl benzyl alcohol, 3,4-dimethyl benzyl alcohol, 2-amino-3-methyl benzyl alcohol, 2,4-dimethoxy benzyl alcohol, 3,5-dimethoxy benzyl alcohol, 2,3-dimethoxy benzyl alcohol, 3-ethoxy-4-methoxy benzyl alcohol, 4-ethoxy-3-methoxy benzyl alcohol, 2-hydroxy-3-methoxy benzyl alcohol, 3,4,5-trimethoxy benzyl alcohol, phenylpropanol, 3-(4-hydroxy phenyl)-1-propanol, 1-phenyl-1-butanol, 2-amino-1-phenyl ethanol, 3,4-dimethoxy phenethyl alcohol, 2-phenyl-1,2-propane diol, 3-phenoxy-1,2-propane diol, 3-methoxy catechol, benzhydrol, methyl benzhydrol, phenethylalcohol, 4-methoxy phenethyl alcohol, 2-hydroxy phenethyl alcohol, 2-amino phenethyl alcohol, or a mixture thereof.

33. An ink composition according to claim 1 containing an alcohol with a melting point of less than about 90° C. and an acoustic loss value of less than 100 decibels per millimeter, wherein the alcohol is present in the ink in an amount of at least about 1 percent by weight of the ink, and wherein the alcohol is present in the ink in an amount of no more than about 69 percent by weight of the ink.

34. An ink composition according to claim 1 containing an alcohol with a melting point of less than about 90° C. and an acoustic loss value of less than 100 decibels per millimeter, wherein the alcohol is present in the ink in an amount of at least about 7 percent by weight of the ink, and wherein the alcohol is present in the ink in an amount of no more than about 60 percent by weight of the ink.

35. An ink composition according to claim 1 containing an antioxidant, wherein the antioxidant is present in the ink in an amount of at least about 0.25 percent by weight of the ink, and wherein the antioxidant is present in the ink in an amount of no more than about 5 percent by weight of the ink.

36. An ink composition according to claim 1 wherein the ink has a melting point of no lower than about 50° C. and wherein the ink has a melting point of no higher than about 150° C.

37. An ink composition according to claim 1 wherein the ink has a melting point of no lower than about 55° C. and wherein the ink has a melting point of no higher than about 120° C.

38. An ink composition according to claim 1 wherein the ink has a melting point of no lower than about 60° C. and wherein the ink has a melting point of no higher than about 100° C.

39. An ink composition according to claim 1 wherein the ink has a melt viscosity at ink jetting temperatures of no more than about 25 centipoise.

40. An ink composition according to claim 1 wherein the ink has a melt viscosity at ink jetting temperatures of no less than about 2 centipoise.

41. An ink composition according to claim 1 wherein the ink has an acoustic loss value of no more than about 100 decibels per millimeter.

42. An ink composition according to claim 1 wherein the ink has an acoustic loss value of no more than about 80 decibels per millimeter.

43. An ink composition according to claim 1 wherein the ink has an acoustic loss value of no more than about 60 decibels per millimeter.

44. An ink composition according to claim 1 wherein the ink has an acoustic loss value of no more than about 40 decibels per millimeter.

45. A printing process which comprises (1) incorporating into a hot melt ink jet printing apparatus an ink composition comprising (a) a carbamate or thiourea, said carbamate or thiourea having a melting point of no higher than about 120° C. and an acoustic loss value of no more than about 100 decibels per millimeter, (b) a colorant, (c) a branched hydrocarbon with a number average molecular weight of no more than about 10,000 and a melting point or softening point of no more than about 120° C., (d) an optional plasticizer, (e) an optional alcohol having a melting point of less than about 90° C. and an acoustic loss value of no more than about 100 decibels per millimeter, (f) an optional lightfastness-imparting agent, and (g) an optional antioxidant; (2) melting the ink, and (3) causing droplets of the melted ink to be ejected in an imagewise pattern onto a recording substrate.

46. A printing process according to claim 45 wherein the recording substrate is paper.

47. A printing process according to claim 45 wherein the recording substrate is a transparency.

48. A printing process which comprises (1) incorporating into an acoustic ink jet printing apparatus an ink composition comprising (a) a carbamate or thiourea, said carbamate or thiourea having a melting point of no higher than about 120° C. and an acoustic loss value of no more than about 100 decibels per millimeter, (b) a colorant, (c) a branched hydrocarbon with a number average molecular weight of no more than about 10,000 and a melting point or softening point of no more than about 120° C., (d) an optional plasticizer, (e) an optional alcohol having a melting point of less than about 90° C. and an acoustic loss value of no more than about 100 decibels per millimeter, (f) an optional lightfastness-imparting agent, and (g) an optional antioxidant; (2) melting the ink; and (3) causing droplets of the melted ink to be ejected by acoustic beams in an imagewise pattern onto a recording sheet.

49. A process according to claim 48 wherein the printing apparatus employs an acoustic ink jet printing process wherein droplets of the ink are formed by acoustic beams without imparting a substantial velocity component toward the print medium, using a droplet forming force that is sufficient only to form the ink droplets, and wherein the printing process further comprises generating an electric field to exert an electrical force different from the droplet forming force on the ink droplets to move the ink droplets toward the print medium, and controlling the electrical force exerted on the formed complete ink droplets by the electric field.

* * * * *